United States Patent

Karl et al.

Patent Number: 5,820,286
Date of Patent: Oct. 13, 1998

[54] FIXING MEANS FOR A WINDSHIELD WIPER SYSTEM

[75] Inventors: Helmut Karl, Schwaigern; Oldrich Krizek, Bietigheim-Bissingen; Alessandro Ortale, Langenbrettach; Eckhardt Schmid, Brackenheim, all of Germany

[73] Assignee: ITT Automotive Europe GmbH, Frankfurt, Germany

[21] Appl. No.: 604,948

[22] PCT Filed: Jul. 22, 1994

[86] PCT No.: PCT/EP94/02427

§ 371 Date: Jun. 7, 1996

§ 102(e) Date: Jun. 7, 1996

[87] PCT Pub. No.: WO95/05959

PCT Pub. Date: Mar. 2, 1995

[30] Foreign Application Priority Data

Aug. 26, 1993 [DE] Germany .......................... 43 28 651.8

[51] Int. Cl.⁶ ................ B60S 1/04; B62D 27/04
[52] U.S. Cl. ................ 403/256; 403/331; 403/226; 403/220
[58] Field of Search ................ 403/256, 331, 403/220, 225, 226; 16/2.1, 2.3; 24/669, 202

[56] References Cited

U.S. PATENT DOCUMENTS

| | | | |
|---|---|---|---|
| 1,892,943 | 1/1933 | Geyer | 403/225 X |
| 3,229,026 | 1/1966 | Sulzer | 16/2.1 X |
| 3,512,226 | 5/1970 | Carlile | 24/669 |
| 4,424,612 | 1/1984 | Muller et al. | 24/669 |
| 4,522,378 | 6/1985 | Nelson | 16/2.1 X |
| 4,704,772 | 11/1987 | Kasai | 24/669 |

FOREIGN PATENT DOCUMENTS

| | | |
|---|---|---|
| 0382346 | 8/1980 | European Pat. Off. . |
| 0382346A2 | 8/1990 | European Pat. Off. . |
| 1185630 | 2/1959 | France ................ 403/225 |
| 3422171 | 12/1984 | Germany . |
| 3422171A1 | 12/1984 | Germany . |
| 3903976A1 | 8/1990 | Germany . |
| 4036367A1 | 5/1992 | Germany . |
| 2218622 | 11/1989 | United Kingdom . |
| 2258145 | 2/1993 | United Kingdom . |

*Primary Examiner*—Anthony Knight
*Attorney, Agent, or Firm*—J. Gordon Lewis; Thomas N. Twomey

[57] ABSTRACT

An attachment for a noise-and-vibration dampening fixing of a windshield wiper system to a vehicle body comprises a fastening eye with a circular aperture for receiving a rubber-elastic, hollow, cylindrical, noise-and-vibration dampening element with circumferential annular groove on its outside surface. Good stability of the attachment and its easy assembling are achieved in that, proceeding from the circular aperture, an open break extends through an edge, raised in an approximately perpendicular manner, so that a web is fastened on yoke tongues of a resulting yoke opening and bridges the yoke opening. The dampening element is insertable sideways through the yoke opening as far as into the aperture.

6 Claims, 3 Drawing Sheets

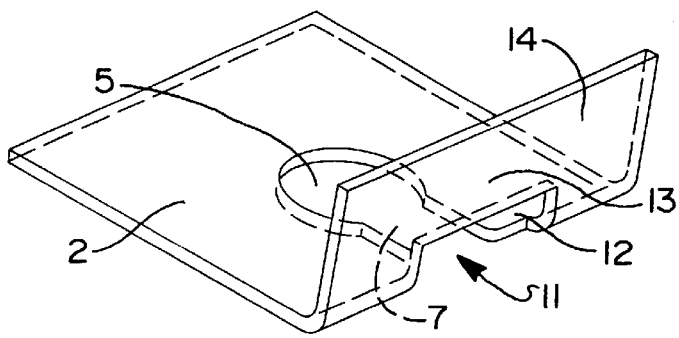
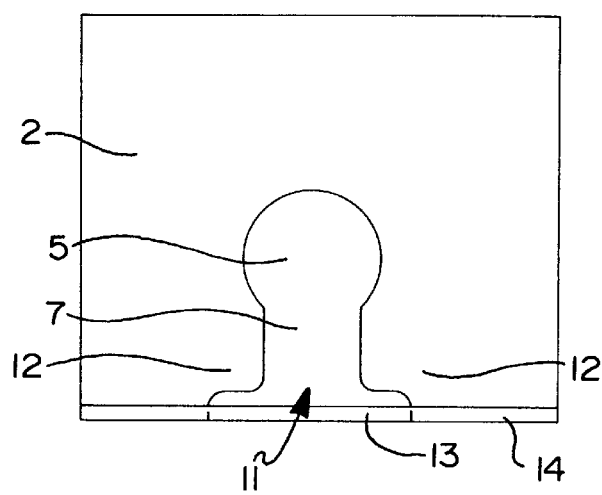
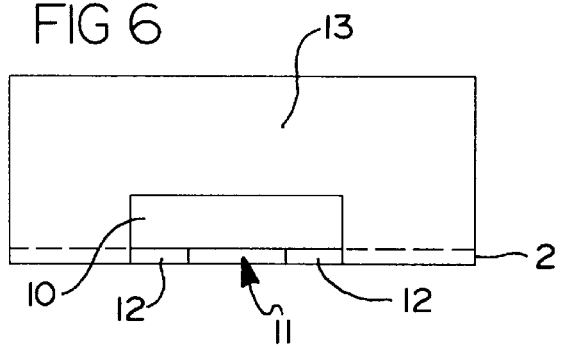
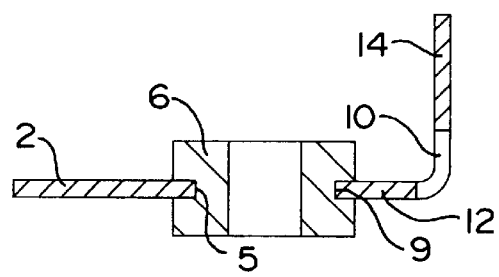

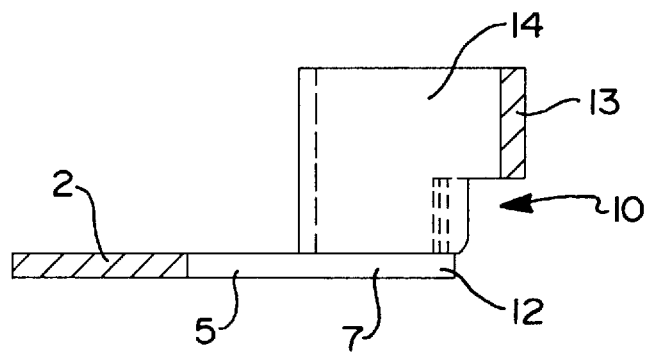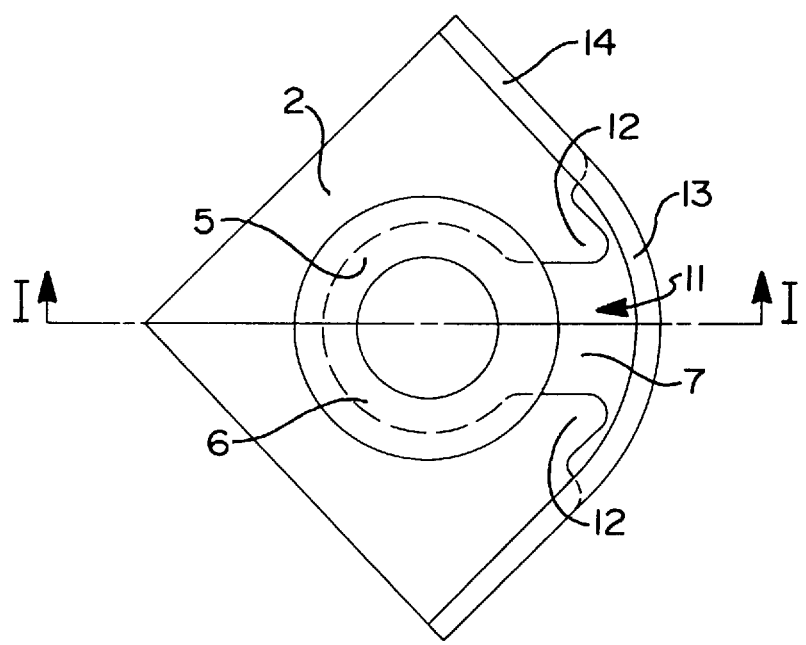

FIXING MEANS FOR A WINDSHIELD WIPER SYSTEM

TECHNICAL FIELD

This invention relates to windshield wiper systems and more particularly relates to a fixing means for a windshield wiper system which allows a noise-dampening attachment of vibration-loaded parts or elements to a vehicle body or parts thereof.

BACKGROUND OF THE INVENTION

DE 40 36 367 A1 discloses a pre-mountable wiper system whose motor carrier plate and wiper bearing housing are equipped with fixing means for vibration-limiting or noise-dampening attachment to the vehicle body. Each of the wiper bearing housings has a lateral mounting projection. These mounting projections and the motor carrier plate feature a through bore provided therein. Buttoned into the through bore is a hollow cylindrical dampening element of rubber-elastic material with an annular groove extending along its outside circumference. The location of the annular groove is about mid-length of the body of the dampening element. The windshield wiper system is to be attached to the vehicle body by means of bolts reaching through the dampening elements.

These fixing means described here are disadvantageous in that it is a very intensive and intricate operation to button the dampening elements into the through bores.

From DE 39 03 976 A1 another premounted wiper system has become known which, inter alia, comprises a die-cast motor carrier part. The motor carrier part features an integrally shaped lateral fastening eye. On one side, this eye is yoked open so that a rubber-elastic dampening element of the type described in DE 40 36 367 A1 can be slid sideways into the opening. The free ends of the yoke tongues approach each other so that the dampening element will be squeezed slightly as it is slid in sideways and will return to its regular original shape when reaching its receiving aperture. The annular groove on the outside circumference of the dampening element and the yoke tongues which approach each other will keep the dampening element within the fastening eye.

This solution admittedly enables easy assembly of the rubber-elastic dampening element, yet introduces another disadvantage. When fastening the wiper system to the vehicle body, the screw connection passing through will squeeze the dampening element axially, with the material of the dampening element tending to escape radially. Thus, the yoke tongues of the fastening eye are under a strong radial pressure which can result in bending apart or even in rupture.

A further prefabricated windshield wiper system is disclosed in GB 2 218 622 A. There, a wiper bearing housing features an integrally shaped lateral mounting projection which opens like a yoke and is capable of receiving a dampening element of the already described type by means of sideward insertion. As already stated with regard to DE 39 03 976 A1, due to the axial compression of the dampening element, here, there will also be radial forces which act on the yoke parts and may cause the same to be bent apart or even to break off.

It is an object of this invention to develop noise-dampening or rather vibration-dampening fixing means for a windshield wiper system which permit easy assembly of the rubber-elastic dampening element, on the one hand, and ensure the required stability of the fastening eye, on the other hand.

According to this invention, this object is solved by a fixing means where a web, connected with both yoke tongues of the fastening eye, bridges the yoke opening so as to enable a rubber-elastic dampening element with its groove on the outside circumference to be slid in sideways through the yoke opening up to where it will be positioned properly within the receiving aperture.

The web bridging the yoke opening gives the fastening eye the stability required in order to prevent the yoke tongues from bending apart or from breaking off. Bridging the yoke opening enables the easy sideward insertion of the dampening element.

In case the part of a windshield wiper system which is to be fastened to the vehicle is a die casting, it will be an advantage if the fastening eye likewise is a die casting and is formed integrally with the mentioned die casting of the windshield wiper system. This fastening eye has a cup-shaped design and the aperture for receiving the rubber-elastic dampening element is located in the cup bottom. The yoke opening which proceeds from the receiving aperture extends through the cup wall so that the web bridging the yoke opening on the provided level is formed by the remainder of the cup wall. This will allow good stability of the entire fastening eye, with the dampening element nevertheless being easily insertable sideways through the yoke opening.

In another embodiment, the fastening eye is made from sheet metal and firmly connected with the respective part of the windshield wiper system. In this case, the web bridging the two yoke tonges is likewise a sheet metal part. This sheet metal part may be approximately U-shaped and may be fastened with the front side of each of its legs on a yoke tongue so that it will stand up from the yoke tongues in an approximately upright manner.

Manufacture of the fastening eye will be easier if the web is formed in one piece with the fastening eye and is formed by a section of the metal plate of the fastening eye which is raised from the remaining plane of the metal plate.

Manufacture of the fastening eye will be rendered even easier if the web is formed by a raised edge of the metal plate.

BRIEF DESCRIPTION OF THE DRAWINGS

FIG. 4 is the perspective representation of a sheet-metal version of a fastening eye for a windshield wiper system.

FIG. 5 is the top view on the fastening eye of FIG. 4.

FIG. 6 is the front view of the fastening eye of FIG. 5.

FIG. 7 is the sectional representation of the side view of the fastening eye of FIG. 6, with the dampening element being inserted.

FIG. 8 is a top view on another embodiment of a sheet-metal version of a fastening eye.

FIG. 9 is a section along line I—I through the fastening eye of FIG. 8 without dampening element.

DETAILED DESCRIPTION OF THE PREFERRED EMBODIMENTS

Figure 1:
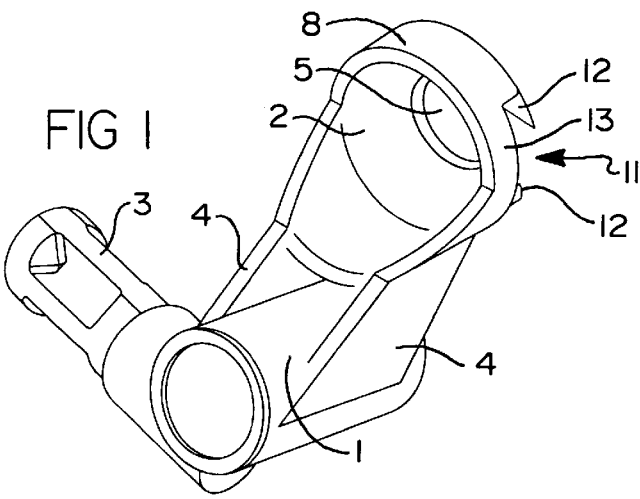
FIG. 1 is the perspective representation of a die-cast version of a housing of a wiper bearing with an integral cup-shaped fastening eye.
Figure 2:
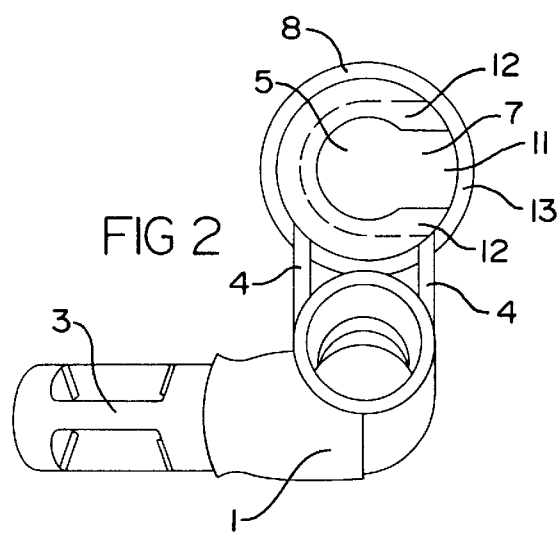
FIG. 2 is the top view on the wiper bearing housing of FIG. 1.
Figure 3:
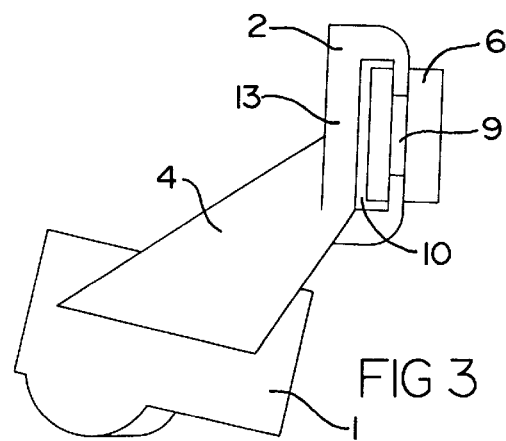
FIG. 3 is a side view of the wiper bearing housing of FIG. 1, with the rubber-elastic dampening element being inserted.

Integrally shaped in one piece with the die-cast version of a wiper bearing housing 1 represented in FIGS. 1 through 3 is a likewise die-cast fastening eye 2. The wiper bearing housing 1 has a pivot 3 integrally shaped therewith. Via this pivot 3, the wiper bearing housing 1 and, thus, the fastening eye 2 are to be connected with the non-represented tubular frame of a windshield wiper system. The fastening eye 2 is held on the wiper bearing housing 1 by means of two ribs 4. The fastening eye 2 itself is approximately cup-shaped, with a circular aperture 5 being provided in the cup bottom for receiving the rubber-elastic dampening element 6. An open break 7 proceeding from this aperture 5 extends as far as and throughout the cup wall 8.

The diameter of the aperture 5 corresponds to the outside diameter of the dampening element 6 at the bottom of the annular groove 9 provided on the outside circumference of the dampening element 6. The open break 7 is narrower than the diameter of the aperture 5. This ensures that the dampening element 6 will be kept safely in the aperture 5 and not get lost.

In the section of the cup wall 8 where the open break 7 extends through the cup wall 8, there is provided the open break 10 in the cup wall 8. This open break 10 is about half the height of the dampening element 6 and the width of the open break 10 is slightly larger than the outside diameter of the dampening element 6. Together, the open break 7 and the open break 10 form the yoke opening 11 enclosed by the yoke tongues 12. The yoke tongues 12 are bridged by a web 13 which is formed by the remainder of the cup wall 8 in the section of the yoke opening 11, said web 13 being connected in one piece with the yoke tongues 12.

Insertable into the fastening eye 2 is a rubber-elastic noise-dampening element 6 which is a hollow cylindrical part with a circumferential annular groove 9 provided and arranged about mid-way in the outside surface. Insertion of the dampening element 6 takes place by inserting it sideways with the annular groove 9 through the yoke opening 11 as far as into aperture 5. The fixing means and, together with the same, the windshield wiper system are fixed to the vehicle body by means of a non-represented screw or rather threaded bolt penetrating the dampening element 6.

FIGS. 4 through 7 illustrate another example of an embodiment. There, the fastening eye 2 is made from a metal plate with an edge 14 raised in an approximately upright manner. Provided in the base surface of the metal plate is a circular aperture 5 for receiving a rubber-elastic dampening element 6, with the diameter of the aperture 5 again corresponding to the outside diameter of the dampening element 6, which outside diameter is formed by the bottom of the circumferential annular groove 9.

An open break 7 proceeding from the aperture 5 extends as far as and through the raised edge 14, with a rectangular open break 10 provided in the raised edge 14 in the merging area of the open break 7. The open break 7 is narrower than the diameter of the aperture 5; the open break 10 is higher than half the height of the dampening element 6 and wider than the largest outside diameter of the dampening element 6. The two open breaks 7 and 10 form the yoke opening flanked by the yoke tongues 12. The remainder of the raised edge 14 forms the approximately U-shaped web 13 which bridges the yoke opening 11 and which, because of its connection in one piece with the yoke tongues 12, procures the desired stability of the fastening eye 2.

The fastening eye 2 itself is firmly connected with one part of the windshield wiper system by means of one side of the metal plate such as the side opposite to the raised edge 14. Thus the fastening eye 2 may be fastened to a non-represented wiper bearing housing or it can be formed in one piece with a non-represented motor carrier plate.

A rubber-elastic dampening element 6 of the type already described can be slid sideways with its annular groove 9 through the yoke opening 11 up to where it will adopt its final position as illustrated in FIG. 7. In passing the open break 7, there will be a slight elastic deformation of the dampening element 6 since this open break 7 is narrower than the outside diameter of the dampening element 6 at the bottom of the annular groove 9. Within the aperture 5, the dampening element 6 may return to its original shape and thus be caught, as it were, by the aperture, thereby a locking action being effected.

The windshield wiper system is to be fastened to a vehicle body by means of screws or threaded bolts or similar suitable means penetrating the bore of the dampening element 6.

FIGS. 8 and 9 show a last example of an embodiment. The here represented fastening eye 2 is again made from sheet metal, the actual metal plate having a section shaped like a circular arc and continued tangentially on both sides. In this circular arc section and in the tangentially adjoining sides, the edge 14 of the plate is again raised rectangularly which, for instance, may be done by deep drawing. In the base surface of the fastening eye 2, again, there is provided the aperture 5 which is to receive the non-illustrated dampening element 6 and when the open break 7 proceeds towards the centre of the circular arc section of the edge 14 and, there, through the same. In the merging area of the open break 7, there is the open break 10 in the raised edge 14 in order to enable the dampening element 6 to be slid in sideways as far as into the aperture 5.

The remainder of the raised edge 14 here again forms the web 13 bridging the yoke opening 11 and being perpendicular to the yoke tongues 12 and firmly connected with the same. The insertion of a dampening element 6 as well as the fastening of the fastening eye 2 plus the windshield wiper system, again connected therewith, to a vehicle body are done the same way as in the example of embodiments already described.

Concluding, there is no need for the web 13 to be formed in one piece together with the fastening part. It may also be manufactured separately and then, afterwards, be connected firmly with the yoke tongues 12,e.g., by means of spot or butt welding. There is likewise no need for the web 13 to be arranged on the outer edge of the fastening eye 2. It may also be arranged somewhat inwards with regard to the edge of the fastening eye 2.

We claim:

1. Fixing means for a windshield wiper system for attachment of vibration-loaded components of the windshield wiper system to a vehicle body, the fixing means comprising:

a fastening eye adapted to be connected with a respective part of the windshield wiper system, the fastening eye being provided with a receiving aperture and an open break proceeding therefrom, the open break defining two yoke tongues and a yoke opening therebetween, the open break being narrower than the diameter of the receiving aperture, a fixing element to connect the fastening eye to the respective part of the windshield wiper system, a hollow, cylindrical, rubber-elastic, noise-and-vibration dampening element adapted to be inserted into the fastening eye, the dampening element being made with an annular groove on an outside circumference thereof and being insertable sideways and with the annular groove through the yoke opening as far as into the receiving aperture, the dampening element being adapted to receive the fixing element, and a web connected with the two yoke tongues to bridge the yoke opening for the yoke tongues to thereby withstand a radial pressure exerted by the fixing element and enable an easy insertion of the dampening element.

2. Fixing means for a windshield wiper system as claimed in claim 1, wherein the fastening eye is an integrally formed part of a die-cast element of the windshield wiper system, wherein the fastening eye has a cup-shaped design with a cup wall and a cup bottom, with the aperture for receiving the noise-and-vibration dampening element being located in the cup bottom; and wherein the yoke opening extends through the cup wall, with the web across the yoke opening being formed by a part of the remainder of the cup wall.

3. Fixing means for a windshield wiper system as claimed in claim 1, wherein the fastening eye is fabricated from sheet metal and is firmly connected with the respective part of the windshield wiper system, and the web is a sheet metal part fastened on the yoke tongues.

4. Fixing means for a windshield wiper system as claimed in claim 3, wherein the web is shaped in one piece with the fastening eye and is formed by means of a section of the same raised out of the plane of the fastening eye.

5. Fixing means for a windshield wiper system as claimed in claim 3, wherein the fastening eye is a metal plate one edge of which is bent in an approximately perpendicular manner, and the yoke opening extends through the bent edge so that the remainder of the bent edge forms the web.

6. Fixing means for a windshield wiper system as claimed in claim 3, wherein the fastening eye is a metal plate with an edge which, sectionally, has the shape of an arc, in particular of a circular arc, with the edge of the metal plate being raised at least in the arcuate section, and the yoke opening extends through this arcuate section of the edge.

* * * * *